US010671930B2

(12) United States Patent
Perincherry et al.

(10) Patent No.: US 10,671,930 B2
(45) Date of Patent: Jun. 2, 2020

(54) KNOWLEDGE INFERENCE APPARATUS AND METHODS TO DETERMINE EMERGING INDUSTRIAL TRENDS AND ADAPT STRATEGIC REASONING THEREOF

(71) Applicant: Indiggo Associates LLC, Bethesda, MD (US)

(72) Inventors: Vijay Perincherry, Potomac, MD (US); Janine Gelbart, Bethesda, MD (US); Marc Inzelstein, Rockville, MD (US)

(73) Assignee: Indiggo Associates LLC, Bethesda, MD (US)

( * ) Notice: Subject to any disclaimer, the term of this patent is extended or adjusted under 35 U.S.C. 154(b) by 1044 days.

(21) Appl. No.: 15/143,629

(22) Filed: May 1, 2016

(65) Prior Publication Data

US 2017/0316322 A1 Nov. 2, 2017

(51) Int. Cl.
*G06N 5/04* (2006.01)
*G06N 5/02* (2006.01)
*G06Q 10/10* (2012.01)
*G06F 16/951* (2019.01)
*G06Q 50/20* (2012.01)

(52) U.S. Cl.
CPC ............ *G06N 5/04* (2013.01); *G06F 16/951* (2019.01); *G06N 5/022* (2013.01); *G06Q 10/105* (2013.01); *G06Q 10/1093* (2013.01); *G06Q 50/205* (2013.01)

(58) Field of Classification Search
None
See application file for complete search history.

(56) References Cited

U.S. PATENT DOCUMENTS

| 8,200,527 | B1 | 6/2012 | Thompson et al. |
| 10,255,700 | B2 | 4/2019 | Perincherry et al. |
| 10,373,074 | B2 | 8/2019 | Perincherry et al. |
| 2006/0004680 | A1* | 1/2006 | Robarts ............. G06F 1/163 706/12 |
| 2011/0307328 | A1 | 12/2011 | Crites et al. |
| 2012/0246302 | A1 | 9/2012 | Lafleur et al. |

(Continued)

FOREIGN PATENT DOCUMENTS

WO WO 2014/040175 A1 3/2014

OTHER PUBLICATIONS

Extended European Search Report dated Aug. 16, 2017, in European Application No. 17165375.1 filed on Apr. 6, 2016, 6 pages.
(Continued)

*Primary Examiner* — Alan Chen
(74) *Attorney, Agent, or Firm* — Cooley LLP

(57) ABSTRACT

Knowledge inference apparatus and method to determine emerging industrial trends and adapt strategic reasoning thereof are provided. In some aspects, user data, user stimulus-responses and user tracked data is received at a knowledge inference apparatus from multiple compute devices. The knowledge inference apparatus can generate compressed multidimensional profiles corresponding to multiple users and infer based on the received data, and the compressed multidimensional profiles multiple emerging trends developing in an industry. In some other aspects, the knowledge inference apparatus can further develop individualized strategic information for the multiple users to adequately respond to the inferred emerging trends.

30 Claims, 6 Drawing Sheets

(56) References Cited

U.S. PATENT DOCUMENTS

| | | |
|---|---|---|
| 2013/0262483 A1 | 10/2013 | Blom et al. |
| 2013/0266918 A1 | 10/2013 | Tinjust |
| 2017/0293855 A1 | 10/2017 | Perincherry et al. |
| 2017/0294037 A1 | 10/2017 | Perincherry et al. |
| 2019/0251718 A1 | 8/2019 | Perincherry et al. |

OTHER PUBLICATIONS

Extended European Search Report for EP Patent Application 17165376.9 dated Aug. 17, 2017, 7 pages.

* cited by examiner

KNOWLEDGE INFERENCE APPARATUS AND METHODS TO DETERMINE EMERGING INDUSTRIAL TRENDS AND ADAPT STRATEGIC REASONING THEREOF

CROSS-REFERENCE TO RELATED PATENT APPLICATIONS

This patent application is related to U.S. patent application Ser. No. 15/092,349, filed on Apr. 6, 2016 entitled "Apparatus and Methods for Generating Data Structures to Represent and Compressed Data Profiles;" and U.S. patent application Ser. No. 15/092,351, filed on Apr. 6, 2016 entitled "Adaptive Systems, Apparatus and Methods for Correlating Compressed Multidimensional Data Profiles to Engagement Rules;" the entire contents of which are both hereby incorporated by reference.

FIELD OF DISCLOSURE

One or more embodiments described herein relate generally to knowledge inference apparatus and methods to determine emerging industrial trends and adapt strategic reasoning thereof, and more specifically to the determination of trends and individuals' mindsets in response and/or as a result of such trends.

BACKGROUND

Emerging industrial trends can occur rapidly sometimes leaving little or no time for individuals to adequately strategize and adapt to a new trend. Sometimes when individuals are not timely aware of an emerging trend they may react inadequately missing critical industry and professional development opportunities. Additionally, some individuals may have unfounded perceptions of their own strengths and weaknesses. The combination of untimely detection of emerging trends and individuals' misperceptions of their personality traits and abilities can inhibit changes to their customary behaviors. In some instances, the adoption of new behavioral changes may be highly desirable for an individual or group of individuals to adapt and professionally survive in a particular industry. Thus, needs exists for technologies to timely and reliably detect emerging industrial trends and accordingly provide customized strategic information to individuals so they can adjust their behavioral patterns according to new environmental demands.

SUMMARY

In one aspect a knowledge inference apparatus can receive, at the one or more processors, a stimulus-response of a user and user attributes. The knowledge inference apparatus can modify, based on the stimulus-response and the user attributes, a user compressed multidimensional data profile. The knowledge inference apparatus can generate a user performance assessment based on user a compressed multidimensional data profile, the user performance assessment representing a first state in which the user remains with respect to a targeted goal state. The knowledge inference apparatus can execute, based on the user performance assessment, multiple productions rules stored in a knowledge base to generate strategic information to advance the user to a second state closer to the targeted goal state, and send, the strategic information to a compute device corresponding to the at least one user.

DETAILED DESCRIPTION

Figure 1:
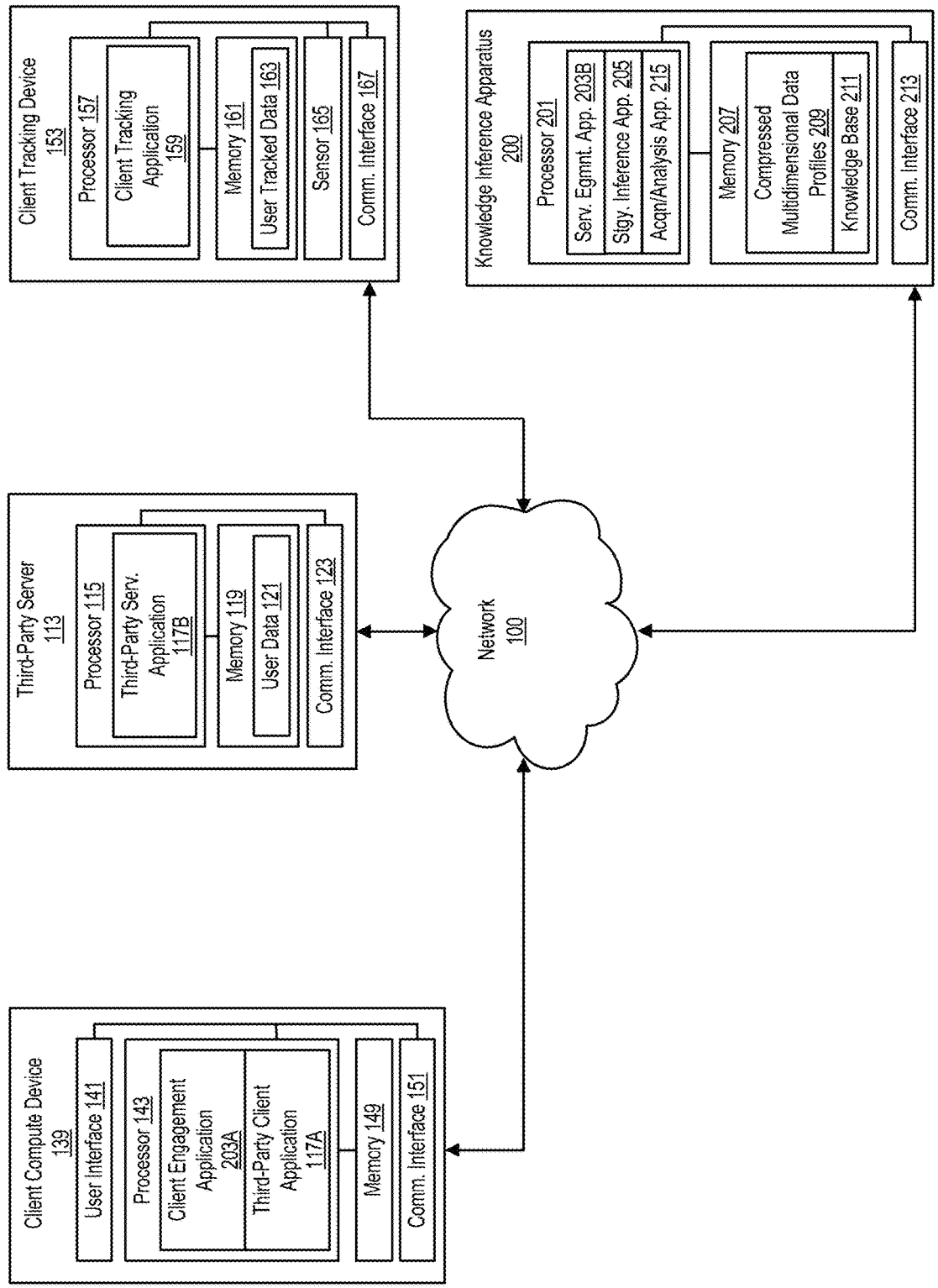
FIG. 1 is a block diagram of a system showing a knowledge inference apparatus to extract industrial trends that is connected, via a network, to a client compute device, a third-party server, and a client compute device, according to an embodiment.

One technique to collect insights of an individual behavior(s), for example, leadership skills, management skills, strategies to select one reasonable alternative over another equally reasonable alternative, actions favored by an individual, and participation on activities, can be based on interviews and questionnaires. These data collection techniques, however, can be sometimes unreliable because individuals can have unfounded self-perceptions and/or unfounded perceptions of an industry. Often, individuals are unaware of empirical behavioral data supporting or refuting these perceptions. As a result, data collected through interviews and questionnaires can be susceptible to personal bias unfounded knowledge and/or misconceptions.

Some embodiments described herein relate generally to knowledge inference apparatus and methods for determining emerging trends and adapting strategic knowledge. In some embodiments, knowledge inference apparatus and computer-implemented methods can unobtrusively collect raw data from multiple compute devices associated with an individual. These raw data can be processed to generate inferences, produce new knowledge or assertions regarding an individual's leadership skills, individual's management skills, individual's customary strategies to select one reasonable alternative over another equally reasonable alternative, actions favored by an individual, and the individual's participation on activities associated with a particular industry or community. In some further embodiments the apparatus and methods described herein, can determine emerging industrial trends and accordingly provide customized guidance, strategic information and tools for an individual to overcome new challenges in view of such emerging industrial trends.

Some embodiments described herein relate generally to knowledge inference apparatus and methods of extracting aggregate industrial trends from individual performance and mindset profiles. In some embodiments empirical data is collected from multiple compute devices representing choices individuals are making, actions they are taking, activities, and similar behavioral data. The collected data can be, for example, transformed into production rules to support continuous learning of the individuals and prescribe strategic information to achieve one or more targeted goals for those individuals. The collected data also can be, for example, transformed into compressed multidimensional data profiles and production rules for the inference of compressed multidimensional data profiles representative of a user mindset, strategic information, and/or types of engagement content.

In some further embodiments, production rules can be modified or defined according to new reasoning knowledge acquired through collected data. In yet some further embodiment, trends can be determined based on collected data, compressed multidimensional data profiles and/or users' response to one or more stimulus requests. Other aspects are related to the inference of emerging trends based on empirical data collected from multiple devices. The emerging trends can be related to a user, a group of users and/or an organization. The knowledge inference apparatus can further generated new reasoning knowledge and provide to multiple users strategic information to adequately respond the emerging trend.

As used herein, an "application" can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "application" is intended to mean a single application or a combination of applications. For instance, a "network" is intended to mean a single network or a combination of networks.

FIG. 1 is a block diagram of a system showing a knowledge inference apparatus to extract industrial trends that is connected, via a network, to a client compute device, a third-party server, and a client tracking device, according to an embodiment. More specifically, FIG. 1 shows the knowledge inference apparatus 200 connected to the client compute device 139, the third-party server 113 and the client tracking device 153 via the network 100. It should be understood, however, that the knowledge inference apparatus 200 can be connected to any number of client compute devices, third-party servers, client tracking and other similar compute devices via any number of networks, not shown in FIG. 1.

As described in further detail herein, the knowledge inference apparatus 200, the client compute device 139, the third-party server 113 and the client tracking device 153 are compute devices that can be communicatively and/or operatively connected to each other via any suitable network 100 (e.g., the Internet using an Internet Service Provider (ISP)). In some implementations the client compute device 139, the third-party server 113 and/or the client tracking device 153 can share user data with the knowledge inference apparatus 200 periodically, repeatedly, on-demand and/or in real-time or near real-time. In some further implementations, the client compute device 139 can receive information from the client tracking device 153 and thereafter, send the user data to the knowledge inference apparatus 200 via the network 100. Similarly, the client compute device 139 can receive user data from the third-party server 113 and thereafter, send the user data to the knowledge inference apparatus 200 via the network 100.

In some implementations, a connection via the network 100 can be defined between any two devices, including the apparatus 200, the third-party server 113, the client tracking device 153 and the client compute device 139. The knowledge inference apparatus 200, the third-party server 113, the client tracking device 153 and the client compute device 139 can send and receive data through established connections on the network 100. As shown in FIG. 1, for example, a connection can be established between the knowledge inference apparatus 200 and any of the third-party server 113, the client-tracking device 153, and/or the client compute device 139. The knowledge inference apparatus 200, the third-party server 115, the client tracking device 153 and the client compute device 139 can communicate with each other through the network 100 via intermediate networks and/or alternate networks (not shown in FIG. 1). Such intermediate networks and/or alternate networks can be of a same type and/or different type of network as network 100. For example, the user tracking device 153 can be connected to the client compute device 139 via Bluetooth® basic rate/enhance rate, Bluetooth® with low energy and other similar types of wireless communications.

While the implementations described herein are described with respect to user data, it should be understood that any other type of suitable information can be processed by the knowledge inference apparatus 200. For example, in some implementations, the knowledge inference apparatus 200 can send individualized strategic information to a user in direct communication with the client compute device 139 upon determining a new industrial trend. For another example, the third-party server can send information related to a group of users associated with a particular industry, for example, employees' performance evaluations provided by employers or coworkers, and other type of user related data.

Figure 2:
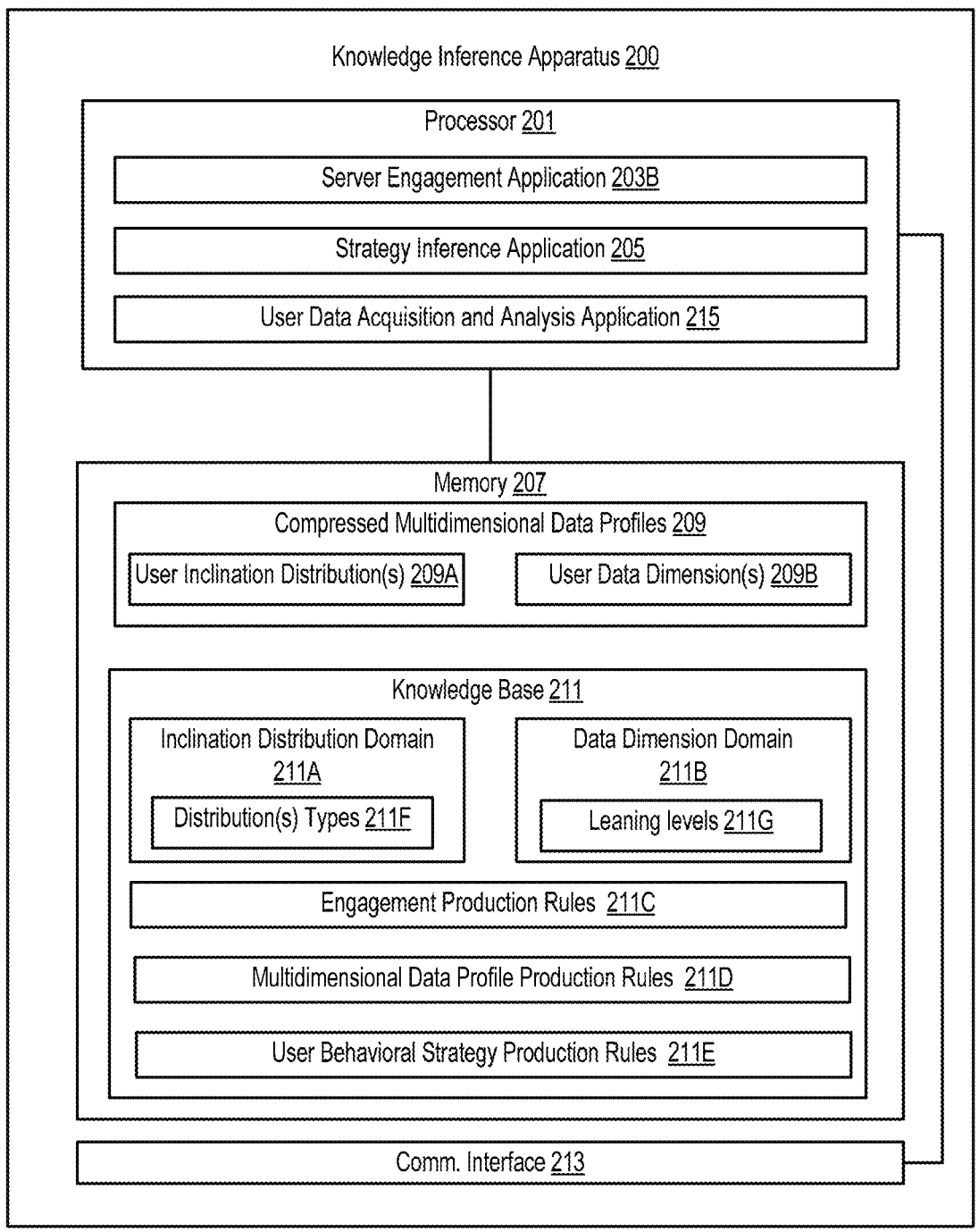
FIG. 2 is a block diagram of a knowledge inference apparatus to extract industrial trends and generate individualized strategic information, according to an embodiment.

As shown in FIG. 2, the knowledge inference apparatus 200 includes processor 201, server engagement application 203B, strategy inference application 205, user data acquisition and analysis application 215, memory 207 and communication interface 213. The processor 201 can be implemented using a microprocessor, such as an application-specific integrated circuit (ASIC), a central processing unit (CPU) with local memory (e.g., read-only memory (ROM)), a general purpose processor, and similar processing units. The transmission and reception of data between the knowledge inference apparatus 200 and other compute devices can be performed through the communication interface 213 across the network 100. The memory 207 can be, for example, a random access memory (RAM), a memory buffer, a hard drive, a database, an erasable programmable read-only memory (EPROM), an electrically erasable read-only memory (EEPROM), a read-only memory (ROM) a virtual memory implemented in a virtual machine and/or so forth. In some instances, the memory 207 can store compressed multidimensional data profiles 209, and knowledge base 211.

In some instances, the memory 207 can store instructions to cause the processor 201 to execute applications, modules, processes and/or functions associated with server engagement application 203B, strategy inference application 205 and user data acquisition and analysis application 215. In addition, the memory 207 can store instructions to cause processor 201 to execute applications, modules, processes and/or functions associated with sending to and/or receiving data from an application included in another compute device. Some examples of applications or modules included in other compute devices include client engagement application 203A and third-party application 117A, both installed in client compute device 139; third-party application 117B installed in third-party server 113; and client tracking application 159 installed in client tracking device 153. Accordingly, knowledge inference apparatus 200 can collect empirical data from multiple compute devices associated with one or more users.

Returning to FIG. 1, the client tracking device 153 includes processor 157, client tracking application 159, memory 161, sensor 165 and communication interface 167. The processor 157 can be implemented using a microprocessor, such as an application-specific integrated circuit (ASIC), a central processing unit (CPU) with local memory (e.g., read-only memory (ROM)), a general purpose processor, and similar processing units. In some instances the memory 161 can store user tracked data 163 captured via the sensor 165. The sensor 165 can be any suitable sensor capable to detect, measure, and/or respond to a user behavior and/or the physical environment surrounding a user. Thus, some example of suitable sensors include heart rate sensors, blood oxygen sensors, calorie burn sensors, sleep quality sensors, light sensors, barometers, thermometers, accelerometers, gyro sensors, compasses, inclinometers, and similar type of sensors.

The memory 161 can be, for example, a random access memory (RAM), a memory buffer, a hard drive, a database, an erasable programmable read-only memory (EPROM), an electrically erasable read-only memory (EEPROM), a read-only memory (ROM) a virtual memory implemented in a virtual machine and/or so forth. In some instances, the memory 161 can store instructions to cause the processor 157 to execute applications, modules, processes and/or functions associated with client tracking application 159. In addition, the memory 207 can store instructions to cause processor 157 to execute applications, modules, processes and/or functions associated with sending to and/or receiving data from an application or module included in another compute device, for example the user data acquisition and analysis application 215 installed in the knowledge inference apparatus 200. The transmission and reception of data between the client tracking device 153 and other compute devices can be performed through the communication interface 167 across the network 100.

In some instances, the client tracking device 153 can be any suitable ubiquitous compute device including wearable devices worn by a user under, with, or on top of clothing, for example, watches, glasses, contact lenses, e-textiles, headbands, jewelry and the similar devices to communicate over the network 100. In yet some other further implementations, the client tracking device 153 can be any suitable device of the Internet of Things (IoT) transmitting telemetry data and receiving commands from, for example, the client compute device 139 or the third-party server 113. Some examples of suitable IoT devices include home monitoring devices, automation devices, vehicles, toys and/or other similar IoT devices.

The client compute device 139 can be any suitable client compute device including stationary compute devices (for example, a desktop computer), mobile compute devices (for example, tablets, laptops and cellular phones such as Blackberry® or an iPhone®) and other similar compute devices. Specifically, client compute device 139 includes a processor 143 coupled to a memory 149. The processor 143 can be implemented using a microprocessor, such as an application-specific integrated circuit (ASIC), a central processing unit (CPU) with local memory (e.g., read-only memory (ROM)), a general purpose processor, and similar processing units. The memory 149 can be, for example, a random access memory (RAM), a memory buffer, a hard drive, a database, an erasable programmable read-only memory (EPROM), an electrically erasable read-only memory (EEPROM), a read-only memory (ROM) a virtual memory implemented in a virtual machine and/or so forth. In some instances, the memory 149 can store instructions to cause the processor 143 to execute, applications, modules, processes and/or functions associated with client engagement application 203A and/or third-party client application 117A. In addition, the memory 149 can store instructions to cause processor 143 to execute applications, modules, processes and/or functions associated with sending to and/or receiving data from an application or module included in another compute device, for example the user data acquisition and analysis application 215 installed in the knowledge inference apparatus 200.

In some instances, the transmission and reception of data between the client compute device 139 and other compute devices can be performed through the communication interface 151 across the network 100. A user can respond to stimulus requests and view prescribed strategic information generated by the knowledge inference apparatus 200 via the client compute device 139, specifically through the user interface 141, and which can include a graphical user interface (GUI) and an input device(s) such as a touchscreen, keyboard, mouse, keypad, and similar input or peripheral devices.

The third-party server 113 can be any suitable compute device configured to run and/or execute third-party server application 117B and store user data 121. The third-party server 113 includes processor 115, third-party application 117B, memory 119 and communication interface 123. The processor 115 can be implemented using a microprocessor, such as an application-specific integrated circuit (ASIC), a central processing unit (CPU) with local memory (e.g., read-only memory (ROM)), a general purpose processor, and similar processing units. The memory 119 can be, for example, a random access memory (RAM), a memory buffer, a hard drive, a database, an erasable programmable read-only memory (EPROM), an electrically erasable read-only memory (EEPROM), a read-only memory (ROM) a virtual memory implemented in a virtual machine and/or so forth.

The third-party client application 117A and the third-party server application 117B can be understood as a distributed client-server application, sometimes referred in this document as third-party application 117. Specifically, third-party server 113 includes processor 115 coupled to memory 119. In some instances, memory 119 can store instructions to cause the processor 115 to execute applications, modules, processes and/or functions associated with third-party server application 117B. In some instances, the third-party server application 117 can be configured, for instance, to provide Software as a Service (SaaS) e.g., Google Apps™ Microsoft® Office 365™, Salesforce®, Workday, Concur, Citrix GoToMeeting®, Cisco WebEx® and similar SaaS applications. In some other instances, the third-party server application 117 can be configured to implement a Social Network (SN) platform and similar types of cloud-based applications. The described SaaS and SN application are some examples or third-party applications 117, however, any other suitable type of third-party application can be integrated to the knowledge inference apparatus 200. In addition, the memory 119 can store instructions to cause processor 115 to execute applications, modules, processes and/or functions associated with sending to and/or receiving data from an application or module included in another compute device, for example the user data acquisition and analysis application 215 installed in the knowledge inference apparatus 200.

In some instances the third-party server 113 can be any type of suitable server for example, a web server, an application server, a proxy server, a telnet server, a file transfer protocol (FTP) server, a mail server, a list server, a collaboration server, a virtual server, and other similar type of servers.

FIG. 2 is a block diagram of a knowledge inference apparatus to extract industrial trends and generate individualized strategic information, according to an embodiment. As shown in FIG. 2, a knowledge inference apparatus 200 includes processor 201, memory 207 operatively and/or physically coupled to the processor 201 and communication interface 213 also operatively and/or physically coupled to the processor 201. The processor 201 can execute instructions stored in the memory 207 to implement the server engagement application 203B, the strategy inference application 205, and the user data acquisition and analysis application 215.

In some implementations, server engagement application 203B can be a server side application configured to exchange data with a client side application, for example, the client engagement application 203A installed in the client compute device 139 shown in FIG. 1. Accordingly, the server engagement application 203B can exchange data with the client engagement client engagement application 203A to implement multiple engagements explained in more detail in further sections of this document. A user, in direct communication with a client compute device having an engagement client application installed (for example, client compute device 139 in FIG. 1) can view and respond to multiple engagement requests generated by the server engagement application 203B.

As discussed earlier, the client engagement application 203A in FIG. 1 and the server engagement application 203B in FIG. 2 can be understood as a distributed client-server application, sometimes referred in this document as engagement application 203. In some implementations, engagement application 203 can include one or more of a software application ("app"), a graphical user interface (GUI), and/or a command line interface. Engagements can include for example interactive forms or graphics, prompts, text messages, pop-up windows, calendar reminders, emails, meeting requests, hyperlinks, news articles, graphical content, individualized strategic information, individualized nudges, individualized notifications, stimulus prompts and other similar types of interactive and non-interactive media.

The processor 201 can be implemented using a microprocessor, such as an application-specific integrated circuit (ASIC), a central processing unit (CPU) with local memory (e.g., read-only memory (ROM)), a general purpose processor, and similar processing units. The memory 207 can include a volatile memory (e.g., random access memory (RAM)) and/or a non-volatile memory, such as read-only memory (ROM), programmable read-only memory (PROM), erasable programmable read-only memory (EPROM), electrically erasable programmable read-only memory (EEPROM) and/or the like.

The memory 207 stores data including one or more compressed multidimensional data profiles 209 and a knowledge base 211. The memory 207 can also store processor-issuable instructions (or processor-executable instructions), which can cause the processor 201 to perform processes described herein.

In some implementations, a compressed multidimensional data profile 209 can be a compressed data structure that includes a vector representation of an individual's preferences or "leanings" (also referred to herein as "user inclination distributions 209A") associated with each of a set of attitudinal factors or "user data dimensions 209B" of interest. A user inclination distribution 209A can have a unimodal or a multimodal distribution. The compressed multidimensional data profiles 209 can be generated through a series of interactions of the individual with the engagement application 203. In some implementations, a compressed multidimensional data profile 209 can be associated with an individual or user, while in other implementations; a compressed multidimensional data profile 209 can be associated with a group of individuals or organizations. Compressed multidimensional data profiles 209 can include one or more user inclination distributions 209A and one or more associated user data dimensions 209B. For example, a user data dimension 209B can be related to self-awareness; the inclination distributions 209A (leanings) can be presented, for example, on a scale of one to ten, where a value of one represents "unaware" and a value of ten represents "extremely self-aware." For another example, a user data dimension 209B can be related to action-oriented a user may be; accordingly, the user inclination distributions 209A (leanings) can then be represented, for example, on a scale of one to ten, where a value of one represents "reluctant" and a value of ten represents "eager to act".

Compressed multidimensional data profiles 209, and the related user inclination distribution 209A values and user data dimensions 209B, are discussed in more detail in U.S. patent application Ser. No. 15/092,349, filed on Apr. 6, 2016 entitled "Apparatus and Methods for Generating Data Structures to Represent and Compressed Data Profiles;" and U.S. patent application Ser. No. 15/092,351, filed on Apr. 6, 2016 entitled "Adaptive Systems, Apparatus and Methods for Correlating Compressed Multidimensional Data Profiles to Engagement Rules" the entire contents of which are hereby incorporated by reference.

In some implementations, knowledge base 211 includes inclination distribution domain 211A, and data dimension domain 211B. The inclination distribution domain 211A includes a collection of distribution types 211F that can be included in a compressed multidimensional data profile 209. Some distribution types in the inclination distribution domain 211A can be case-specific or customized to a user, group of users and/or organization. For example, in the context of industrial trends affecting individuals' leadership and management behaviors, the inclination distribution domain 211A can include distribution types associated with personal traits such as action orientation, openness, verification style, judgment style, self-awareness and other similar type of distribution types. The data dimension domain 211B can include a set of leaning labels or ordinal values 211G of each distribution type or dimension and value ranges corresponding to each leaning label for each of the distribution types included in the user inclination distribution 209A. For example, the data dimension domain 211B can include a range of values to determine that an individual leans towards the "skeptical" ordinal value with respect to the "openness" dimension, which represents his/her willingness to accept or positively respond to new or different ideas, and/or opinions provided by other individuals. Accordingly, an inclination distribution can be divided into multiple leaning labels or ordinal values, each ordinal value defined as a range of values that could match empirical user data gathered by the knowledge inference apparatus 200.

Table 1 shows some examples of distributions types and associated leaning labels or ordinal values with respect to user profiles in a leadership and management program.

TABLE I

TABLE OF DISTRIBUTION TYPES AND
ASSOCIATED LEANING LABELS

| Distribution Type | Description | Leaning Labels for extremes of the range |
|---|---|---|
| Action orientation | Predisposition to take action | Passive-Active |
| Openness | Willing to accept different ideas and opinions | Skeptical-Accepting |
| Verification | Approach to verifying and validating | Personal experience-Recommendations |
| Judgment style | Style of making judgments about persons or things | Slow to judge-Quick to judge |
| Self-awareness | Awareness of one's own strengths and weaknesses | Very unaware-Very aware |

For each distribution type, an individual can be represented by an inclination value range, which is a numerical distribution whose endpoints (i.e., maximum and minimum values) are defined, for example, by the "leaning labels" set forth in Table 1 above. For example, the "Passive-Active" range associated with the distribution type of "action orientation" can span a numerical range of 1 to 10, where 1 corresponds to "passive" and 10 corresponds to "active."

A compressed multidimensional data profile can include a set of inclination value ranges (e.g., multiple inclination value ranges for each multidimensional data profile where each set of inclination values relates to a different distribution type). The compressed multidimensional data profile can be generated using "empirical data" drawn from behaviors of individuals. As used herein, "empirical data" can refer to a behavioral choice or action of an individual where that behavioral choice or choice has been translated into a stimulus-response signal and mapped to a distribution type, for instance, based on a predefined set of production rules. For example, if an individual responds to a question (or "stimulus") regarding whether he/she had considered a leadership development program in the past with a response of "yes," the question-answer pair (or stimulus-response pair) is translated into a positive stimulus-response signal that is mapped to a distribution type of "desire to improve" (also referred to as "openness" as shown in Table 1).

In some implementations, empirical data can be based on the occurrence of any action taken by an individual, whether such an action is taken in response to an explicit stimulus or not (e.g., scheduling a meeting without being prompted, providing feedback to an employee without being prompted, user data gathered via a client tracking device, user data collected from a third-party server and other similar types of user data). Through engagement of the individual with the knowledge inference apparatus 200, a set of stimulus-response signals can be generated, and each stimulus-response signal of the set of stimulus-response signals can be mapped to one or more associated inclination values of one or more compressed multidimensional data profiles as described above.

Some additional aspects of inclination distribution types that can be included in the inclination distribution domain 211A, and leaning labels or ordinal values that can be included in the data dimension domain 211B, are discussed in more detail in the aforementioned U.S. patent application Ser. No. 15/092,349 incorporated by reference.

The knowledge base 211 can further include multiple sets of production rules, also referred to herein as rule bases containing production rules, for example engagement production rules 211C, compressed multidimensional data profile production rules 211D, and user behavioral strategy production rules 211E. In general, production rules are used in rule-based problem-solving processes; in this instance the production rules can be implemented by and in the knowledge inference apparatus 200. In some implementations, an initial set of production rules can be elicited from one or more experts. Additionally or alternatively, a supervised learning algorithm can be used to train the knowledge inference apparatus 200. Accordingly, the knowledge inference apparatus can learn from user behavioral data associated to a given a type of users, for example, users displaying high self-awareness. Thus, the knowledge inference apparatus 200 can produce one or more rule bases to make future predictions about users with unknown self-awareness levels. Similarly, unsupervised learning algorithms can be utilized to train the system about unknown user behaviors and/or traits.

A production rule can contain several "if" patterns also known as a rule antecedent and one or more "then" patterns also known as rule consequent. Accordingly, one or more rules may be executed based on assertions or empirical data retrieved by the knowledge inference apparatus 200 and/or analytical processes performed by the knowledge inference apparatus 200. For example, in some instances, assertions can be derived from user stimulus-responses, raw data retrieved from the client tracking device 153 and processed data retrieved from the third-party server 113 (shown in FIG. 1).

In general, the production rules stored in the knowledge based 211 can be configured to specify actions, make deductions and/or inferences. For example, some production rules can be configured to specify actions or instructions for a user or an agent to overcome obstacles in their path to reach a targeted goal state. Moreover, a production rule can include in their antecedent and/or consequent an associated predetermined compressed multidimensional data profile 209, which in turn includes one or more user inclination distributions 209A and one or more associated user data dimensions 209B. In some embodiments, the compressed multidimensional data profiles 209 of individuals and multidimensional data profiles included in the body of production rules described herein can have the same or similar structure.

In some embodiments, the production rules stored in the knowledge base 211 can be an independent entity within an overall population of production rules (or "rule base"), and in some implementations a production rule can include three components, for example:

an antecedent clause that is contained within the IF statement (i.e., a "condition");
a consequent clause that is contained with the THEN statement (i.e., an "outcome"); and
a degree of certainty or "confidence" associated with the rule.

As just mentioned, production rules in the rule bases 211C, 211D and 211E can have an associated confidence level, which is a numeric measure of the validity associated with a production rule. When more than one production rule can be applied according to a set of given assertions, the most appropriate production rule can be determined based on the production rules' confidence levels. In some instances, a rule confidence level can be associated with the level of confidence of a match between a rule antecedent and one or more assertions. For example, new empirical data can match one or multiple rule antecedents at different confidence levels (e.g., as determined by the processor 201 based, at least in part, on the individual's compressed multidimensional data profile 209). Accordingly, the selection of one or more production rules can be based on a measure that combines the qualification of the antecedent clause with an associated confidence level.

In other instances, a rule confidence level can be associated with the level of confidence of a rule consequent. For example a new inferred assertion or action generated upon the execution of a given production rule can have a confidence level expressed as a probability between 0 and 1. In such a case, the confidence level can represent how certain the new assertion is, with a value of 0 indicating that an assertion is definitely false and 1 indicating that an assertion is definitely true. Moreover, a rule's confidence level can be decreased or increased depending on whether or not a new assertion or action as prescribed by the rule's consequent results in an expected or permissible outcome. For example, if the consequent of an executed production rule produces a new assertion later found to be false or nil, then the rule's confidence value may be decreased by a predetermined fraction of a unit. For another example, if the consequent of an executed production rule produces an action type of outcome, for example, a new strategic step that did not lead a user to a second state closer to a targeted goal state, then the rule's confidence value may be similarly decreased by a predetermined fraction of a unit. For yet another example, when a production rule's consequent results in an accurate, predicted or greater than expected outcome, the rule's confidence level can be increased by a predetermined fraction of a unit. Thus, in some instances the knowledge inference apparatus 200 can reinforce the knowledge or learning expressed by the production rules in the knowledge base 211.

The reinforcement of knowledge or learning can occur over several iterations and one or more production rules can be executed per iteration. The outcomes of the executed rules can be assessed or evaluated to determine their effectiveness over specific and/or overall user behaviors. Accordingly, the knowledge inference apparatus 200 can determine, over time, optimal production rules for any specific context, maximizing the performance of users, groups of users and/or organizations.

In some implementations, the server engagement application 203B can receive one or more stimulus-response from a user via the client engagement application 203A installed in the client compute device 139 shown in FIG. 1. Thereafter, the server engagement application 203B can select one or more engagement production rules 211C. In some instances, when the antecedent clause of an engagement production rule is satisfied, or upon "qualification" of the antecedent clause (e.g., when there is a Boolean match of the antecedent clause). A consequent clause can be asserted. The server engagement application 203B can be configured to update the confidence level of production rules over time. For example, confidence level can be updated based upon historical interactions and/or current stimulus-responses provided by a user, via the engagement application 203.

The antecedent clause and the consequent clause of a production rule, collectively, define a conditional statement. In some embodiments, a conditional statement of an engagement production rule in 211C can be structured as follows:
  IF (individual is of type T1)
  THEN (engage using engagement/content type C1).

In the above engagement production rule example, the type T1 of an individual can be defined on the basis of combining a user's individual compressed multidimensional data profile 209 with a vector representing the user's specific actions, and a vector representing the user specific choices.

In some instances an action can be something a user does via the engagement application 203, including, for example, making a selection (e.g., mouse click), scheduling a meeting they organize, sharing a summary, etc. A choice can be an action chosen by an individual from an array of possible actions including, for example, a selection of a radio button from a radio button group specifying an answer to a close-ended question, responses to proffered situations, and similar inputs. In other instances, an action and other user data can be derived from user-tracked data retrieved from a client tracking device 153 and/or a third-party server 113 shown in FIG. 1.

In some embodiments, engagement production rules 211C can be related to specific combinations of compressed multidimensional data profiles 209, actions and choices, to associated content types C1. A content type can be the type of information provided to the individual, for example, in response to actions and choices. For example, the content can be an article, a message, an email, a notification; thus, the content type indicates that type or category of information appropriate for a given individual.

Qualification of the antecedent clause can be performed using multivalued match, which represents a degree of match between an individual's compressed multidimensional data profile 209 and a compressed multidimensional data profile associated with the antecedent clause of an engagement production rule under consideration. A mathematical matching "(m)" of compressed multidimensional data profiles can be defined as:

$$M(I)(m)M(R) = \text{Aggregation over all } X \text{ of } (ID(X,I)(m) ID(X,R))$$

where $M(I)$ is the multidimensional data profile of an individual I, $M(R)$ is the multidimensional data profile defined in the antecedent of the rule R, $ID(X, I)$ is an inclination distribution of individual I on dimension X, and $ID(X, R)$ is the inclination distribution specified in rule R on dimension X.

Depending upon the structure of the rule, the aggregation over all X of $(ID(X,I) (m) ID(X, R))$ can vary from $\min(\ )$ for AND combinations to $\max(\ )$ for OR combinations. The operator (m) is a non-commutative property. In other words, $ID(X, I) (m) ID(X,R)$ is defined as follows:

$$ID(X, I)(m)ID(X, R) = \frac{\left( \sum_{i=1,} \frac{(\min(\text{lean}(X, I)_i, \text{lean}(X, R)_i)),}{(\min(inc(X, I), inc(X, R)))} \right)}{\left( \sum (\text{lean}(X, I)_i), i = 1, \frac{10}{(\min(inc(X, I), inc(X, R)))} \right)} \quad (1.1)$$

whereas $ID(X,R) (m) ID(X, I)$ is defined as:

$$ID(X, R)(m)ID(X, I) = \frac{\left( \sum_{i=1,} \frac{(\min(\text{lean}(X, I)_i, \text{lean}(X, R)_i)),}{(\min(inc(X, I), inc(X, R)))} \right)}{\left( \sum (\text{lean}(X, R)_i), i = 1, \frac{10}{(\min(inc(X, I), inc(X, R)))} \right)}, \quad (1.2)$$

where (m) is a matching operator, X is a data dimension of a set of data dimensions, ID(X,I) is an inclination distribution of a set of first inclination distributions, ID(X,R) is an inclination distribution of a set of second inclination distributions of an engagement rule R of a set of engagement rules, inc(X, I) is a time increment of the inclination distribution of the set of first inclination distributions, inc(X, R) is a time increment of the inclination distribution of the set of second inclination distributions, lean(X, I) is a value of an inclination distribution of the set of first inclination distributions, and lean(X, R) is a value of an inclination distribution of the set of second inclination distributions.

Multidimensional data profile production rules 211D can be configured to make deductions regarding personality traits of an individual or group of individuals. These deductions can be viewed as new assertions and can be kept in memory 207, for example, by updating or modifying a user inclination distribution 209A or a user data dimension 209B in one or more of the user compressed multidimensional data profiles 209. An individual's compressed multidimensional data profile 209 can include a collection or consolidation of inclination value ranges along multiple distribution types. In some additional or alternative embodiments, the compressed multidimensional data profiles 209 can be generated according to one or more apparatuses, methods, and processes described in more detail in the aforementioned U.S. patent application Ser. No. 15/092,349, incorporated by reference.

In general, some production rules (e.g., production rules in 211C, 211D and/or 211E) can alternatively or additionally be configured to specify actions, rather than assertions. For example, the user behavioral strategy production rules 211D can include "then" patterns or clauses specifying strategic information, including one or more actions a user may perform to reach a targeted goal state or upon the discovery of a new industrial trend. A targeted goal state can be, for instance, a state associated with the minimization of a user behavior that has been proved negative to an individual. For example, the knowledge inference apparatus 200 can determine that according historical data user A tends to skip lunch whenever he or she schedules a meeting between 1:00 PM and 2:30 PM. Accordingly, the knowledge inference apparatus 200, via the strategy inference application 205, can execute one or more user behavioral strategy production rules applicable to user A. As a result, the knowledge inference apparatus 200 can send, via the communication interface 213, strategic information each time user A is about to schedule a meeting between the aforementioned hours. In some instances, the strategic information sent to user A can include a message suggesting a new meeting time. In such a case, the knowledge inference apparatus 200, via the strategy inference application 205, can select a new meeting time by accessing the calendars of one or more meeting parties and resolving any schedule conflicts shown the calendars of the one or more meeting parties. Additionally or alternatively, the knowledge inference apparatus 200 can suggest and/or schedule a time on the user A's calendar to take a break and have lunch. It should be understood that multiple user behavioral strategy production rules 211D suggesting multiple actions can be included in knowledge base 211 including reactive production rules upon the detection of a new industrial trend, reactive production rules upon the detection of a change of a compressed multidimensional data profile 209, and/or reactive rules upon the detection of a new negative behavior displayed by an specific user, group of users and/or organizations.

In some implementations, the knowledge inference apparatus 200 can pre-process raw data and/or post-process new assertions or consequents generated by the production rules in the rule bases 211C, 211D, and 211E. For example, the user data acquisition and analysis application 215 can receive raw data associated with a user and thereafter perform one or more statistical and/or probabilistic analyses before feeding the user data to the knowledge base 211. The acquisition and analysis application 215 can receive data from multiple sources, for example, the client user device 139, the client tracking device 153, the third-party server 113 (shown in FIG. 1) and/or any other suitable compute device. In some instances, the analysis performed in the application 215 can include one or more of an interval analysis(es), descriptive statistic for interval data, confidence limits on a distribution, measures of central tendency, percentile-based thresholds that indicate the value below which a given percentage of observations in a group of observations fall, measures of dispersions, inferential statistics, methods for handling uncertainty measures, and other similar statistical analysis. A more detailed description of the acquisition and analysis application 215 is provided with respect to FIG. 6 of this document.

Figure 3:
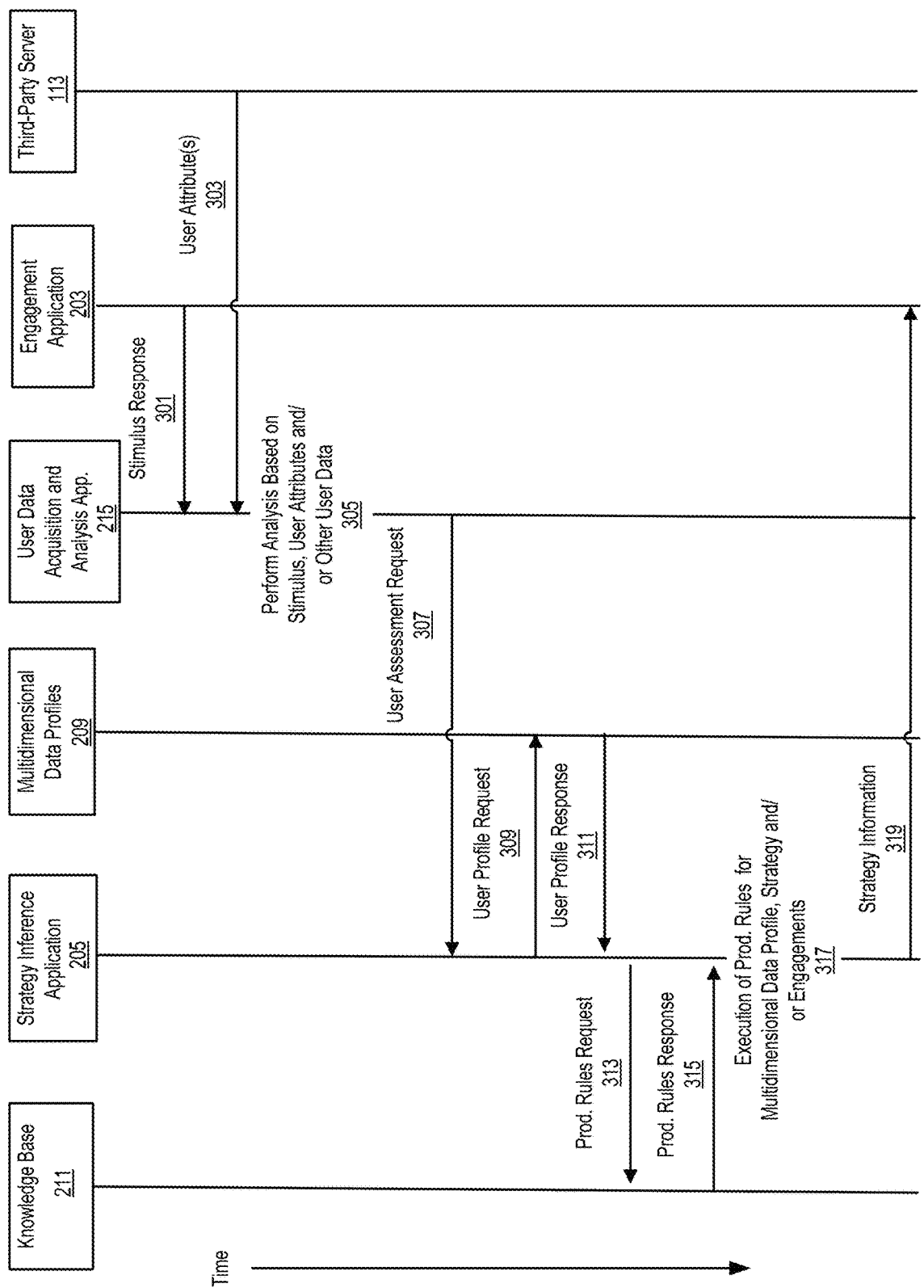
FIG. 3 is a message flow diagram illustrating a computer implemented method to generate individualized strategic information from empirical data, according to an embodiment.

FIG. 3 is a message flow diagram illustrating a computer implemented method to generate individualized strategic information from empirical data, according to an embodiment. FIG. 3 is discussed in reference to the knowledge inference apparatus 200, and the third-party server 113 introduced in FIG. 1. In some implementations, the user data acquisition and analysis application 215 can receive user data from the engagement application 203 and a third-party server 113. As discussed above, the engagement application 203 can be a client-server application including, for example a client engagement application 203A and server engagement application 203B, both shown in FIG. 1. Thus, the user data acquisition and analysis application 215 can receive a stimulus-response 301 from a user via the engagement application 203.

In some instances, the user data acquisition and analysis application 215 can alternatively or additionally receive one or more user attributes 303 from the third-party server 113. The third-party server 113 can host or implement a third-party server application 117B can, for instance, to provide Software as a Service (SaaS) e.g., Google Apps™, Microsoft® Office 365™, Salesforce®, Workday, Concur, Citrix GoToMeeting®, Cisco WebEx® and similar SaaS applications. In some other instances, the third-party server can be configured to implement a Social Network (SN) platform, for example, Facebook®, LinkedIn®, Twitter®, Evernote®, WhatsApp® and the like social networks.

In some additionally or alternative embodiments, the user attributes 303 can be sent to the user data acquisition and analysis application 215 from an application installed in the client compute device 139. In such a case, a user in communication with the client compute device 139 can download one or more plugin software components from the knowledge inference apparatus 200 to add specific features to existing applications running or installed in the client compute device 139. For example, one or more plugin software components can be downloaded to send user attributes collected from third-party SaaS applications, third-party Social Network applications, and/or third-party local applications installed or running in the compute device 139. Alternatively, or additionally, a user can download from the knowledge inference apparatus 200 one or more customized software applications configured to collect and/or synchronize data with the third-party SaaS applications, third-party Social Network applications and/or other third-party local applications. For example, a customized agenda application can be downloaded from the knowledge inference apparatus 200, configured to interact with one or more third-party applications in the client compute device 139.

User attributes can be any type of user data entered by a user and/or produced or uploaded to a software application, for example, an email application, calendar application, or agenda application like the ones included in Microsoft® Outlook®, Gmail™ and Google Calendar™. Accordingly, user attributes related to events scheduled in one or more calendars can be retrieved and compared between each other to resolve scheduling conflicts or to perform further analysis of a user behavior. Similarly, user attributes can include a calendar content including data related to a scheduled event, for example, time, allocation, topics, purpose of the event, meeting notes and desired outcome for that event directly from an agenda application, calendar application, email application and the like type of applications. For another example, user attributes can include ongoing-event data generated by one or more users while an event is taking place. Accordingly, annotations made by one or more users attending the event can be received on real-time or near real-time by the user data acquisition and analysis application 215. Similarly, user attributes can include post-event data including final decisions made during the event, how these decisions were made and identifiers for the participants collaborating, supporting, opposing and approving such decisions. Such decisions can be "strategic" decisions in the sense that the decisions relate to long-term goals for the user (e.g., goals that are intended or scheduled to be achieved within, for example, within three months, six months, one year, two years, three years, five years, ten years, etc.).

In some implementations, users can access the scheduled event data, the ongoing-event data, the post-event data and similar type of event related data via one or more of a third-party SaaS application, third-party Social Network application and/or other suitable software application. In some other implementations, users can access the event related data earlier discussed via a customized application provided by the knowledge inference apparatus 200.

It should be understood, that user data or user attributes are not limited to calendars and/or event related data, accordingly user data can include any other suitable type of user data that can be use by the knowledge inference apparatus 200 to draw inferences about users' behaviors, emerging trends and similar user and industry patterns.

Returning to FIG. 3, upon retrieving the stimulus response 301 and/or the user attributes 303, the user data acquisition and analysis application 215 can perform one or more analysis(es) 305 based on data related to the stimulus response 301, the user attributes 303 and other type of available user data, for example, user tracked data 163 retrieved from the client tracking device 153 shown in FIG. 1.

In some implementations, the user data acquisition and analysis application 215 can send a user assessment request 307 to the strategy inference application 205. The user assessment request 307 can contain one or more of the stimulus response 301, the user attributes 303, analysis outcomes from the analysis 305 and/or other user data (e.g., user tracked data 163 in FIG. 1). In some implementations, the strategy inference application 205 can produce or generate inferences based on the user data received from the user assessment request 307. In some other implementations, the strategy inference application 205 can send a user profile request 309 with one or more queries and/or parameters to retrieve multidimensional data profiles from the multidimensional data profiles 209 in the memory 207 of the knowledge inference apparatus 200. Accordingly, the strategy inference application 205 can retrieve the user profile response 311. The user profile response 311 can include one or more user inclination distributions 209A and/or user data dimensions 209B.

In some instances, the strategy inference application 205 can send a request for production rules 313 to the knowledge base 211. The strategy inference application can request any of the production rules included in the knowledge base 211. For example, the strategy inference application can request one or multiple engagement production rules 211C, one or multiple multidimensional data profile production rules 211D, one or multiple user behavioral strategy production rules 211E and/or any combination thereof.

In some instances, the production rules request 313 can include one or multiple queries and/or parameters specifying a subset of production rules from the production rules in one or more rule bases included in the knowledge base 211. Thus, the strategy inference application 205 can retrieve the production rules response 315. The production rules response 315 can include the specified subset of production rules. In other instances, the strategy inference application 205 can access all the superset of production rules in the knowledge base 211, for example, overall or general inferences with respect to industry emerging trends and/or groups of users can be achieved by the examination of multiple rule bases included in the knowledge base 211.

The strategy inference application 205 can select and execute multidimensional data profile production rules 211D when the data received in the user assessment request 307 matches the antecedent(s) of such production rules included in production rules response 315. In some implementations, the mathematical matching technique '(m)' described with respect to FIG. 2 can be used; other suitable pattern matching techniques, however, can similarly be used. As discussed earlier, multidimensional data profile production rules 211D can be used to generate new knowledge or update knowledge associated to a user and/or a group of users' including, personal traits and/or mindsets.

The strategy inference application 205 can similarly select and execute user behavioral strategy production rules 211E when the data received in the user assessment request 307 matches the antecedent(s) of such production rules. As discussed earlier, user behavioral strategy production rules 211E can generate new knowledge or update knowledge associated with, for example, an ongoing strategy or a new individualized strategy determined by the knowledge inference apparatus 200 for a user or group of users to achieve a targeted goal state and/or upon the discovery of new emergent industrial trend. Strategies can be defined by user behavioral production rules 211E that have proved their effectiveness over time to achieve a targeted goal. Some strategies can be individualized strategies defined based on user behavior production rules 211E and additional factors including a user multidimensional data profile, a user level of engagement with the engagement application 203, identified trends and/or how responsive the user is to different types of engagements that can be produced through engagement production rules 211 described in more detail below.

Engagement production rules 211C can be selected for execution when the data received in the user assessment request 307 matches the antecedent(s) of such production rules. As discussed earlier, user engagement production rules 211C can generate new knowledge or update knowledge at 317 associated with, for example, a type of engagement the knowledge inference apparatus 200 may send to a user or group of users. In some instances, the engagements can include content with one or more strategic information, and/or information associated with multidimensional data profile associated with one or more users. In other instances, engagement production rules 211C can also be used by the strategy inference application 205 to determine a type of stimulus and/or stimulus request that should be sent to a user after an assessment. The type of stimulus, and/or stimulus request can depend in various factors, including a user or group of users multidimensional data profiles, urgency of the information (e.g., in response to the detection of a new emerging trend) and/or the state where a user or group of user remains with respect to a targeted goal state.

The strategy inference application 205 can execute any of the production rules in the production rules response 315. Accordingly, the execution of production rules 317 can include, for example, multidimensional data profile production rules, strategy information production rules, engagement production rule, any combination thereof or any other suitable type of production rule in the knowledge base 211. In some instances, the strategy inference application 205 can thereafter send strategy information 319 to the engagement application 203 and thus, the strategy information can be delivered to a user or group of users via the engagement application 203. To be more specific, a user in communication with client compute device 139 shown in FIG. 1 can, for example, be notified about the strategy information 319 via the engagement application 203A. Such a notification can be delivered through more multiple types of engagements as inferred by the execution of engagement production rules 211C.

In some instances, the strategy information can suggest one or more actions for the user to be taken in view of an upcoming event. For example, data form past scheduled events, ongoing events and post-events earlier discussed can be used by the strategy inference application 205 to infer and suggest to a user one or more courses of actions, including following up with other users about collective decisions, prepare for future topic discussions, and similar type of information relevant to upcoming events.

Figure 4:
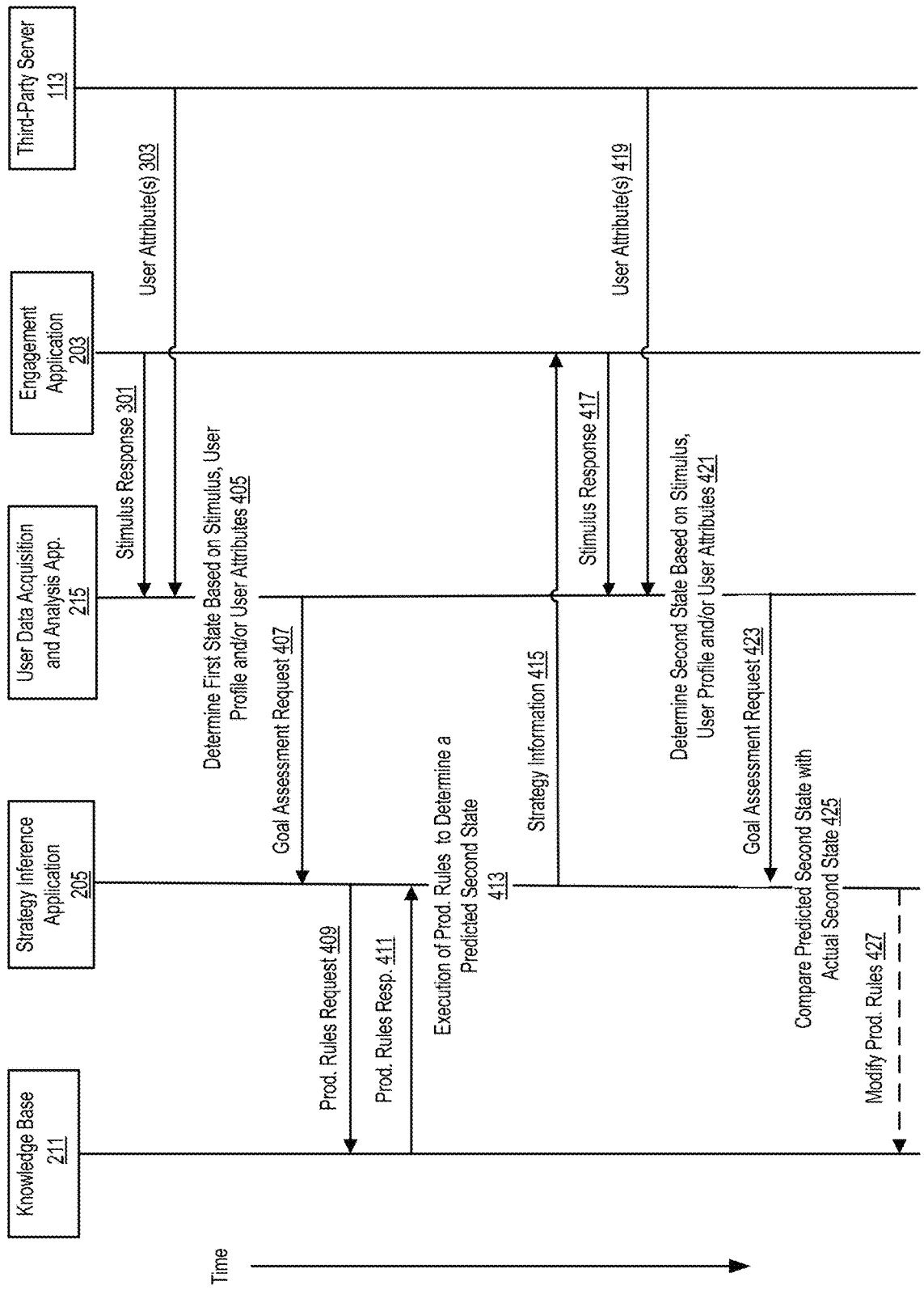
FIG. 4 is a message flow diagram illustrating a computer implemented method to revise and modify production rules stored in a knowledge base, according to an embodiment.

FIG. 4 is a message flow diagram illustrating a computer implemented method to revise and modify production rules stored in a knowledge base, according to an embodiment. FIG. 4 is discussed in reference to the knowledge inference apparatus 200, and the third-party server 113 introduced in FIG. 1. In some implementations, the user data acquisition and analysis application 215 can receive user a stimulus-response 301 from the engagement application 203 as discussed earlier with respect to FIG. 3. Similarly, the user data acquisition and analysis application 215 can additionally or alternatively receive one or more user attributes 303 as discussed earlier with respect to FIG. 3.

In some implementations, the user data acquisition and analysis application 215 can perform one or more statistical and/or probabilistic analysis at 405 (e.g., as discussed in FIG. 2) to determine a first state based on the stimulus response 301, the user attributes 303, user tracked data 163 (shown in FIG. 1) and/or any other suitable type of user data. The first state can include the outcome of one or multiple analyses performed at the user data acquisition and analysis application 215. In some implementations, the first state can be associated with the state where a user or group of users remains with respect to a targeted goal. For example, a targeted goal can be directed to increasing communication among users in a group, decreasing resources (e.g., time) spent by a user or group of users on detrimental activities, and/or any other type of measurable goals.

In some instances, the user data acquisition and analysis application 215 can send a goal assessment request 407 to the strategy inference application 205 with the determined first state. Thereafter, the strategy inference application 205 can send a production rules request 409 to the knowledge base 211. The production rules request 409 can include one or more queries and/or parameters to retrieve production rules from the knowledge base 211. Thus, the strategy inference application 205 can retrieve the production rules response 411 including one or multiple production rules stored in the knowledge base 211. The production rules request 409 and the production rules response 411 can be performed in a similar way as discussed with respect to request 313 and response 315 in FIG. 3. In some instances, heuristics based on algebraic vector distances or mathematical match '(m)' can be used to compare antecedents with assertions, user data, emerging trends and/or similar inferences or facts during the execution of one or more production rules to determine a predicted second state 413. In some implementations the heuristic(s) employed for the prediction of the second state can be monotonic such that, the predicted state will always be closer to the targeted state than the first state. Additionally or alternatively, the strategy inference application can execute the production rules at 413 according to forward propagation, backward propagation or any combination thereof.

In some implementations, the strategy inference application 205 can send strategy information 415 to a user via the engagement application 203. The strategy information 415 can include one or more suggestion or actions for a user or group of users to take to move to (or closer to) the predicted second state. In some implementation, the generation of strategic information to move from a first state to a second state can be seen as a non-deterministic task including inferential relations between assertions, and/or one or more heuristics to select production rules based on such assertions. Thus, some or all of the production rules executed at 413 can produced as a consequent to a suggested action that can be performed by a user to move to a state that is closer to a predetermined goal state.

Thereafter, the user data acquisition and analysis application 215 can receive the stimulus response 417 from the engagement application 203 and/or one or multiple user attributes 419 from a third-party server. Thereafter, the user data acquisition and analysis application 215 can determine a second state 421 based on the stimulus response 417, a user multidimensional profile, a user attribute 419, user tracked data 163 (shown in FIG. 1) and/or any other similar type of user data. As earlier discussed with respect to 407, the user data acquisition and analysis application 215 can send a goal assessment request 423 to the strategy inference application 205.

In some implementations, the strategy inference application 205 can compare, at 425, the predicted second state determined at 413 with the actual second state determined at 421. In some instances, the predicted second state can be equivalent to the actual second state 425, this can be interpreted that the one or multiple production rules executed at 413 accurately predicted the second state. In such a case, the strategy inference application 205 can modify at 427 one or more of the executed rules at 413 by increasing the confidence values of such production rules. In some other instances, the predicted second state can be different from the actual second state; in such a case the strategy inference application 205 can modify at 427 one or multiple of the production rules executed at 413 by decreasing the confidence values of such production rules. In some further implementations, the changes made through the modify production rules 427 command can be beyond increasing or decreasing confidence values, including, changes to an antecedent of a production rule, changes to a consequent of a production rule, removing a production rule and/or adding a new production rule to any of the rule bases 211C, 211D and/or 211E shown in FIG. 2. For example, modifications at 427 can be made whenever a production rule is deemed ineffective, for example, whenever its confidence value has been decreased beyond a threshold value. For another example, modifications at 427 can include new rules prescribing strategic information upon the discovery of a new emerging trend.

It should be understood that the modification of production rules 427 can be sometimes omitted. For example, some production rules may be hardcoded in the knowledge base 211. In some instances, hardcoded production rules can dictate assertions or actions that have to be made whenever a given situation is determined irrespectively of whether or not they result on an optimal state with respect to one or more targeted goal states. Thus, in some instances, hardcoded rule may not be subjected to one or more modifications included confidence levels, changes on their antecedent clauses and/or changes on their consequent clauses.

Figure 5:
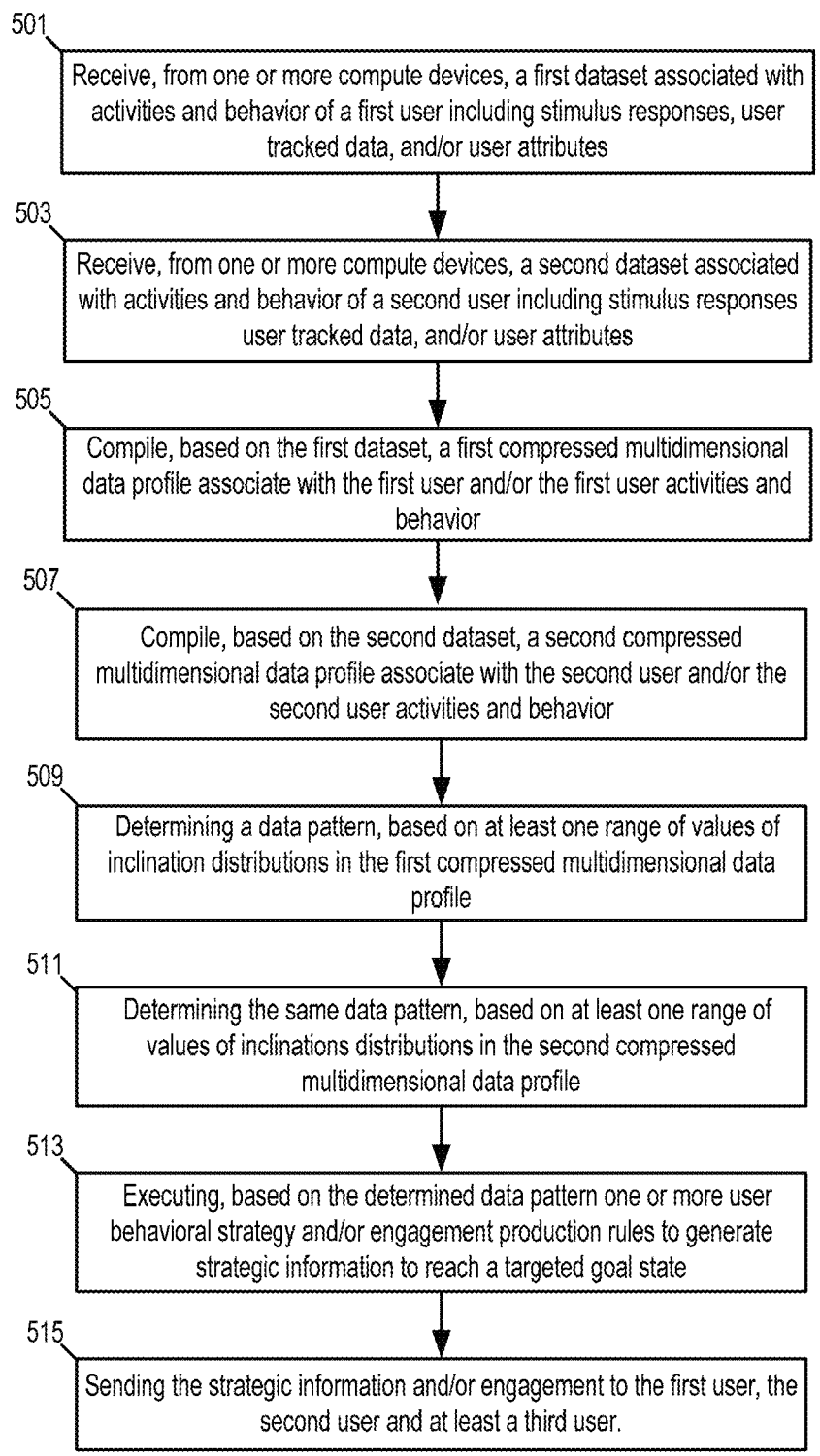
FIG. 5 is a flow chart illustrating a computer implemented method to determine an industrial emerging trend affecting multiple individuals, according to an embodiment.

FIG. 5 is a flow chart illustrating a computer implemented method to determine an industrial emerging trend affecting multiple individuals, according to an embodiment. In some implementations, the knowledge inference apparatus 200 can receive from one or more compute devices, a first dataset associated with activities and/or behaviors of a first user including stimulus responses, user tracked data, and/or user attributes at 501. The knowledge inference apparatus 200 can additionally receive from one or more compute devices, a second dataset associated with activities and/or behaviors of a second user including stimulus responses, user tracked data, and/or user attributes at 503.

In some implementations, the knowledge inference apparatus 200 can compile, calculate and/or perform operations to infer, based on the first dataset, a first compressed multidimensional data profile associated with the first user and/or the first user activities and/or behaviors, at 505. Similarly, the knowledge inference apparatus 200 can compile, based on the second dataset, a second compressed multidimensional data profile associated with the second user and/or the second user activities and/or behaviors, at 507.

In some implementations, the knowledge inference apparatus 200 can determine a data pattern, based on at least one range of values of inclination distributions in the first compressed multidimensional data profile, at 509. As used herein, a compressed multidimensional data profile, can be a vector representation of an individual's preferences or "leanings" (or behavioral leanings) (also referred to herein as inclination range of values) associated with each of a set of attitudinal factors of interest (also referred to herein as distribution types). A compressed multidimensional data profile can be generated through a series of interactions of a user with the engagement application 203, the third-party server shown in FIG. 3 and FIG. 4 and/or the user tracking data shown in FIG. 1. For example, the relative importance assigned to a particular distribution type can be based on (e.g., proportional to) the number of interactions by the user in building up or used as input to form a behavioral leaning (inclination value range). The set or collection of distribution types used to generate a compressed multidimensional data profile can be case-specific, for example, in relation to an emerging trend, and/or customized to the individual. Patterns can be determined with respect to one or more dimensions in a multidimensional data profile, for example, whenever the knowledge inference apparatus 200 receives user data suggesting an atypical user behavior, the atypical behavior can be registered by the knowledge inference apparatus 200 as a new pattern. Other patterns can be similarly determined and alternatively considered typical behaviors of a user, group of users or organizations. Accordingly emerging trends can be identified with respect to different entities associated with an industry or organization.

Returning to FIG. 5, the knowledge inference apparatus 200 can further determine the same or an equivalent data pattern at 511, based on at least one range of values of inclination distributions in the second compressed multidimensional data profile. In some instances, such an equivalent or same pattern can be determined by calculating the difference or algebraic vector distance between one or more range of values of inclination distributions in the first compressed multidimensional data profile and the second compressed multidimensional data profile. Accordingly, the knowledge inference apparatus 200 can determine equal or equivalent patterns whenever the difference or the algebraic vector distance between two inclination distributions is equal to zero or below a predetermined threshold. Thereafter, the knowledge inference apparatus 200 can execute at 513, one or more user behavioral and/or engagement production rules, based on the determined data pattern, and generate strategic information to reach a targeted goal or react to the a new determined pattern or emergent trend. In some instances data patterns can be traced back and correlated to specific events. Such a trace back can be performed by the knowledge inference apparatus 200 through the execution of user behavioral strategy production rules in a backward chaining fashion.

The knowledge inference apparatus 200 can send the strategic information and corresponding engagement generated at 513 to the first user and the second user, at 515. Moreover, in some instances, when a new data pattern is determined in more than one compressed multidimensional data profile, the knowledge inference apparatus 200 can perform a partial or total inspection of the set or a subset of the compressed multidimensional data profiles stored in memory (e.g., compressed multidimensional data profiles 209 in the memory 207 shown in FIG. 2). Thus, the knowledge inference apparatus 200 can preemptively send strategic information and/or a corresponding engagement to, for example, a third user whenever is determined its compressed multidimensional data profile is likely to develop or display the same or an equivalent data pattern.

Figure 6:
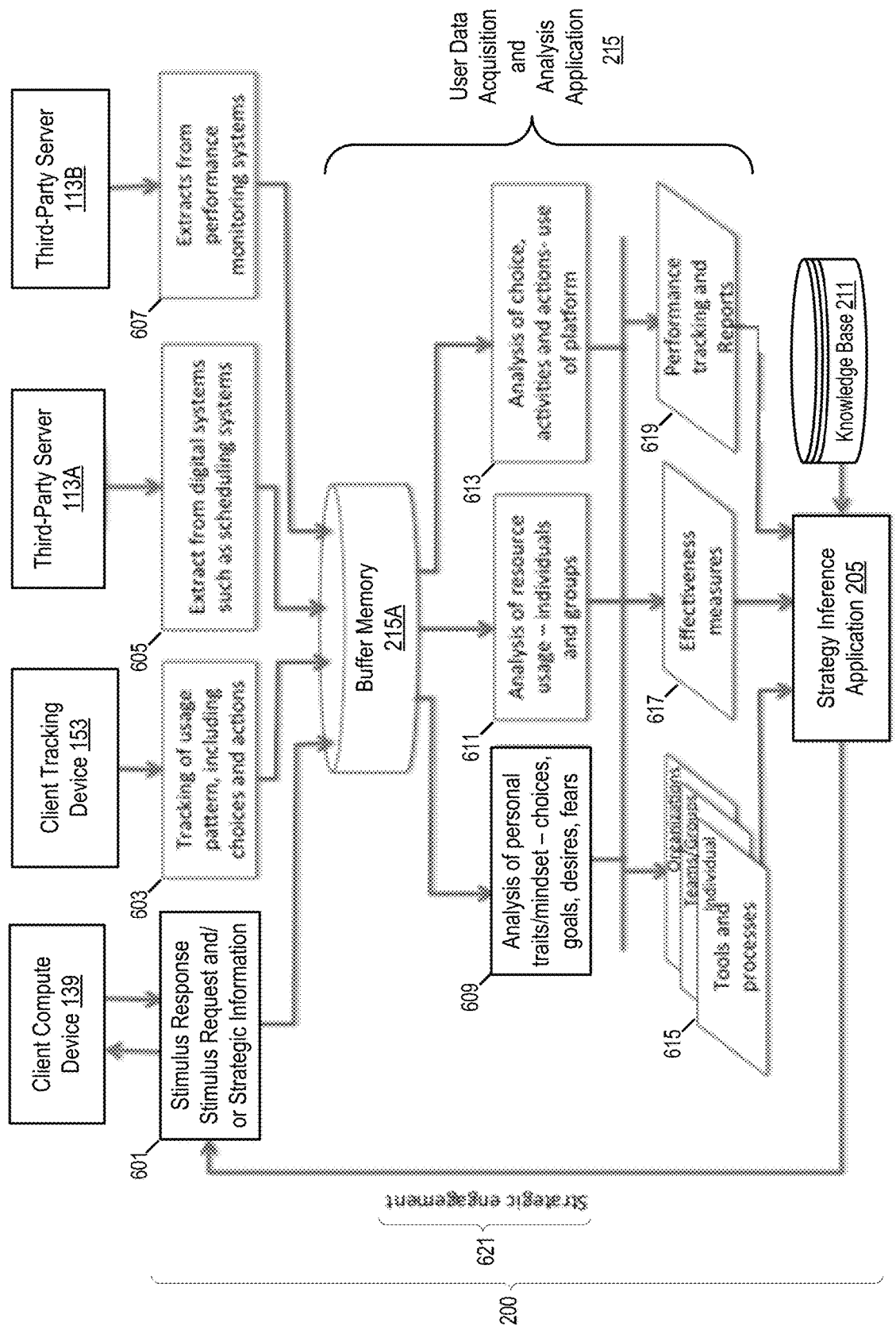
FIG. 6 is a flow diagram illustrating the capture of raw data and intermediate processes executed during the generation of compressed multidimensional data profiles, user behavioral strategies and engagements, according to an embodiment.

FIG. 6 is a flow diagram illustrating the capture of raw data and intermediate processes executed during the generation of compressed multidimensional data profiles, user behavioral strategies and engagements, in an embodiment. In some implementations, the knowledge inference apparatus 200 can collect data from multiple sources. The knowledge inference apparatus 200 can receive stimulus-responses associated with an stimulus request or strategic information 601 from the client compute device 139, user tracked data or tracking of usage patterns including choices and actions 603 from a client tracking device 153, schedule data 605 from scheduling systems implemented on a third-party server 113A, user data from user performance monitoring system implemented on third-party server 113B, and similar user related data from any other suitable compute device.

In some implementations, the collected or retrieved user data 601, 603, 605, and 607 can be stored in a local memory 207A of the knowledge inference apparatus 200. Thus, the collected data is available to the user acquisition and analysis application 215 via the buffer memory 215A to perform one or more analysis(es) including the analysis of personal traits/mindsets at 609 can be derived from user choices, user expressed goals, desires, fears and similar user information which can be acquired through, for example, stimulus-responses. In some implementations, the outcomes of the analysis performed at 609 can be used to generate one or more compressed multidimensional data profiles associated with a specific user, a group of users and/or an organization. The one or more analysis(es) can similarly include the analysis of resources usage 611 specified as resource usage per user, per group of users and/or per organization. The resource usage analysis can, for example, inform users of the time they have spent on multiple activities and how such activities align with a targeted goal or goal state. Another type of analysis can include the analysis of choices, activities, and actions 613. As used herein recurrent actions or activities can refer to specific tasks that a user perform in regular basis, choice can refer to the selection of one possible discourse or alternative over other possible alternatives, and non-recurrent actions or non-recurrent activities can refer to non-recurrent tasks in which a user or group of users participate. Accordingly, the analysis performed at 613 can generate, for example, information on how often a user responds to stimulus requests.

In some implementations, the user data acquisition and analysis application 215 can further generate one or more tools and process at 615, targeting behaviors and practices at an individual, group and/or organizational level, effectiveness measures at 617; and/or performance tracking and performance reports at 619.

In some implementations, the tools and process generated at 615 can include customized tools, including engagements, strategic planning to advance from a first state to a targeted goal state, and inferences based on compressed multidimensional data profiles for the effectiveness of single users, teams, organizational departments and/or entire organizations.

In some implementations, the effectiveness measures generate at 617 can specify how effectively users use resources, for example, time, human resources and any other suitable type of resources correlated to users' effectiveness of leadership and/or organizational skills. Moreover, the effectiveness measures generated at 617 can include how a user behavior impacts his or her wellbeing, the wellbeing of others and/or the organizational effectiveness of other users.

In some implementations, the performance tracking and report generated at 619 can include a summary of a user performance for a determined period of time. The information in the performance tracking and report generated at 619 can include, for example, one or more of the user data 601, 603, 605, 607 and any combination thereof. Additionally or alternatively the performance tracking and report generated at 619 can include one or more assertions or inferences generated by the execution of the production rules discussed earlier with respect to FIG. 2. In some further implementations, the performance tracking performed at and report generated at 619 can track and include emergent trends, common challenges and opportunities shared among users, common choices and actions made or preferred by one or more users. The information in tracked and the performance report generated at 619 can relate users having different roles or titles within and organization. For example a manager and junior executive can share common goals and accordingly these common goals can be included in the performance tracking performed and the performance report generated at 619. It should be understood, that the performance tracking performed and the performance report generated at 619 can similarly relate users across regions, industries and other similar type of groups.

In some implementations, the strategy inference application 205 can receive information regarding the tools and processes generated at 615, the effectiveness measures generated at 617 and the performance tracking performed and the performance report generated at 619. Thereafter, the strategy inference application 205 can select and execute one or more production rules in the knowledge base 211 as earlier discussed and accordingly send a strategic engagement 621 including one or more stimulus requests, and/or strategic information.

In some further instances, the apparatus 200 can be configured to assert actions, and suggestions. Accordingly, actions can be mapped to individual compressed multidimensional data profiles. Moreover, the asserted actions can be updated by the apparatus 200 such that the knowledge base 211 is repeatedly adapting for the development of strategies and the engagement of leaders.

In some instances, the apparatus 200 can provide individualized engagement to one or more users to maximize efficacy of development initiatives. In such a case, the engagement with a user can be performed on the basis of rules that are specific for them.

In some instances, the apparatus 200 can analyze, aggregate, learn leadership and management profiles, behavior from single users and/or group of users from observations of behaviors and actions. As such, computer models of the aggregation of individuals along several categorizations like industry, role, team size, region can be built by the apparatus 200 based on empirical data.

In some further instances, the apparatus 200 can process metrics that represent leadership and management performance. Additionally the apparatus 200 can track and measure the performance using these metrics—growing set of measurable concepts that can be later used. For example, the ratio of hours spent in meetings that included decisions and next steps to the total hours spent in meetings is a measure of leadership effectiveness. Similarly the ratio of actual time spent of specific priorities in comparison with ideal time measures leadership focus, etc.

In some further instances, the apparatus 200 can generate digital representations or GUIs of individual priorities and tracking time spent on individual priorities, and using this as a metric to measure performance and benchmark for comparisons.

In some further instances, the apparatus 200 can generate a digital framework for recording decisions made, and next steps identified during individual or collective work sessions. The apparatus 200 can record decisions made during events, to infer next steps and the users responsible for them.

In some further instances, the apparatus 200 can implement a search engine for users to browse or navigate through decisions and next steps to enable tracking and follow through using search algorithms.

In some further instances, the apparatus 200 can implement a digital method for multiple users accessible through different devices. Accordingly multiple users can work collaboratively, contribute and view notes, decisions and next steps recorded during a group activity by maintaining a multi-device synchronized session in the backend and maintaining near real time concurrency of data entered.

In some further instances, the apparatus 200 can implement one or more methods of sharing notes, decisions and next steps recorded during a session with others, including those that were not participants. This is done by controlling the method of authorization of individuals to view different contents. Thus, a digital method to enable leaders and managers to always be aware of their key priorities and their time allocation efficiencies by automatically synchronizing and integrating events in their digital calendars can be implemented by the apparatus 200. For example such a method can implemented, by linking calendar events with priorities specified by a user or group of users.

In some further instances, the apparatus 200 can provide access to users to a digital calendar to assign individual events and the time spent on events in their calendar according to one or more of their individual or group priorities. Accordingly, a user can determine how much time he/she plans to use performing a task and the apparatus 200 can generate inferences and/or assertions based on such priorities.

In some further instances, the apparatus 200 can implement methods for tracking users' assignments of priorities to events and deduce the users' assignment logic or reasoning to automatically assign priorities to future events through one or more calendars associated with a user or group of users. For, example the apparatus 200 can implement individualized thesauri to assign specific events to priorities on the basis of assertions or inferences made about a user over time.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

The invention claimed is:

1. A knowledge inference apparatus, comprising:
one or more processors;
a memory storing instructions which, when executed by the one or more processors cause the one or more processors to:
receive, at the one or more processors, a first stimulus response of an at least one user and an at least one user attribute of the at least one user, the at least one user attribute received from a first compute device operatively coupled to the apparatus;
modify, based on the first stimulus response and the at least one user attribute, a compressed multidimensional data profile associated with the at least one user;
generate a user performance assessment based on at least the compressed multidimensional data profile, the user performance assessment representing a first state in which the at least one user remains with respect to a targeted goal state;
select an at least one production rule from a plurality of production rules based on a multivalued match, the multivalued match defined as:

$M(I)(m)M(R)$=Aggregation over all $X$ of $(ID(X,I)(m) ID(X,R))$ where M(I) is the compressed multidimensional data profile, M(R) is a multidimensional data profile defined in the antecedent of a production rule R from the plurality of production rules, ID(X, I) is an inclination distribution of the at least one user on a dimension X, and ID(X, R) is an inclination distribution specified in the production rule R from the plurality of production rules on dimension X;
execute the at least one production rule, the at least one production rule including a consequent with strategic information to advance to a second state closer to the targeted goal state than the first state, the second state being after the first state; and
send the strategic information to a second compute device associated with the at least one user.

2. The knowledge inference apparatus of claim 1, wherein the first stimulus response includes information of an at least one of a recurrent activity performed by the at least one user, a non-recurrent activity performed by the at least one user, or a behavioral choice picked by the at least one user and from a group of alternative behavioral choices.

3. The knowledge inference apparatus of claim 1, wherein the at least one user attribute includes information captured by a tracking device associated with the at least one user.

4. The knowledge inference apparatus of claim 1, wherein the at least one user attribute includes information retrieved from a third-party server.

5. The knowledge inference apparatus of claim 1, wherein the memory further stores instructions which, when executed by the one or more processors further cause the one or more processors to:
    send a stimulus request based on the compressed multi-dimensional data profile and the user performance assessment.

6. The knowledge inference apparatus of claim 5, wherein the stimulus request is an interactive digital media content.

7. The knowledge inference apparatus of claim 6, wherein the memory further stores instructions which, when executed by the one or more processors further cause the one or more processors to:
    receive a second stimulus response, via the interactive digital media content and update the at least one production rule based on the second stimulus response.

8. The knowledge inference apparatus of claim 7, wherein the second stimulus response includes a strategic decision made by the at least one user.

9. The knowledge inference apparatus of claim 7, wherein the strategic decision included in the second stimulus response is forwarded to a group of users.

10. The knowledge inference apparatus of claim 6, wherein the interactive digital media content includes a search engine to browse through individual strategic decisions and collective strategic decisions, the individual strategic decisions and the collective strategic decisions associated with the at least one user.

11. The knowledge inference apparatus of claim 5, wherein the stimulus request includes a digital representation with a set of indicators associated with a plurality individual priorities of the at least one user.

12. The knowledge inference apparatus of claim 7, wherein the digital representation further includes a tracked time for each of the individual priorities in the plurality of individual priorities, the tracked time associated with the time the at least one user spent on each of the individual priorities during a period of time.

13. The knowledge inference apparatus of claim 10, wherein:
    for each individual priority from the plurality of individual priorities,
        the digital representation further includes a first calendar with a scheduled time for that individual priority, and
        that scheduled time is associated with a targeted time for the at least one user to spend on that individual priority.

14. The knowledge inference apparatus of claim 13, wherein the first calendar is synchronized with a shared calendar associated with a group of users.

15. The knowledge inference apparatus of claim 1, wherein the memory further stores instructions which, when executed by the one or more processors further cause the one or more processors to:
    modify the targeted goal state based on at least one of the stimulus response, the at least one user attribute, or the performance assessment, and not based on a survey provided to the at least one user.

16. The knowledge inference apparatus of claim 1, wherein the at least one production rule is a user behavioral strategy production rule.

17. The knowledge inference apparatus of claim 1, wherein the at least one user attribute is associated with an event scheduled by the at least one user.

18. The knowledge inference apparatus of claim 1, wherein the strategic information includes at least one alternative action to overcome a scheduled event conflict.

19. The knowledge inference apparatus of claim 1, wherein the strategic information includes at least one new scheduled event.

20. The knowledge inference apparatus of claim 1, wherein the at least one production rule is an individualized production rule uniquely associated with a first user from a plurality of users of the knowledge inference apparatus.

21. The knowledge inference apparatus of claim 1, wherein the memory further stores instructions which, when executed by the one or more processors further cause the one or more processors to:
    execute, based on the user performance assessment, an at least one engagement production rule, the at least one engagement production rule includes a consequent with a stimulus request to collect user data; and
    send the stimulus request to a third compute device associated with the at least one user.

22. A computer-implemented method, comprising:
    receiving, at a processor of a knowledge inference apparatus, a first set of data including data representative of activities performed by an at least one user during a first time interval;
    determining, based on the first set of data, a first state in which the at least one user remains with respect to a targeted goal state;
    selecting a production rule from a plurality of production rules based on a multivalued match, the multivalued match defined as:

$$M(I)(m)M(R)=\text{Aggregation over all } X \text{ of } (ID(X,I)(m) \: ID(X,R))$$

where M(I) is a multidimensional data profile of the at least one user, M(R) is a multidimensional data profile defined in the antecedent of a production rule R from the plurality of production rules, ID(X, I) is an inclination distribution of the at least one user on a dimension X, and ID(X, R) is an inclination distribution specified in the production rule R from the plurality of production rules on dimension X;
    executing, based on the first state, the production rule, the production rule having a consequent with strategic information for the at least one user to advance to a predicted second state closer to the targeted goal state than the first state, the predicted second state being after the first state;
    receiving, a second set of data including data representative of activities performed by the at least one user during a second time interval;
    determining, based on the second set of data a second state in which the at least one user remains with respect to the targeted goal state, the second state being after the first state; and
    modifying the production rule when the second state is different to the predicted second state.

23. The computer-implemented method of claim 22, further comprising:

increasing a confidence value associated with the production rule when the second state is equal to the predicted second state.

24. The computer-implemented method of claim 22, wherein modifying the production rule further includes:
   decreasing a confidence value associated with the production rule.

25. The computer-implemented method of claim 22, wherein modifying the production rule further includes:
   changing an antecedent of the production rule.

26. The computer-implemented method of claim 22, wherein modifying the production rule further includes:
   changing a consequent of the production rule.

27. The computer-implemented method of claim 22, further comprising:
   executing, based on the first set of data, an at least one multidimensional data profile rule, the at least one multidimensional data profile rule having a consequent with new inferences about the at least one user;
   modifying a compressed multidimensional data profile associated with the at least one user based on the consequent to produce a modified multidimensional data profile; and
   sending a stimulus request based on at least the modified multidimensional data profile.

28. The computer-implemented method of claim 22, wherein the first set of data further includes a stimulus-response of the at least one user.

29. The computer-implemented method of claim 22, wherein the first set of data further includes information captured by a tracking device associated with the at least one user.

30. The computer-implemented method of claim 22, wherein the first set of data further includes information retrieved from a third-party server.

* * * * *